(No Model.)

E. W. COOKE.
ROLLER BEARING.

No. 442,359. Patented Dec. 9, 1890.

Witnesses:

Inventor:
Ernest W. Cooke
by
Haupt Brothers
Attorney

THE NORRIS PETERS CO., PHOTO-LITHO., WASHINGTON, D. C.

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

ROLLER-BEARING.

SPECIFICATION forming part of Letters Patent No. 442,359, dated December 9, 1890.

Application filed April 28, 1890. Serial No. 349,831. (No model.)

*To all whom it may concern:*

Be it known that I, ERNEST WILLIAM COOKE, of the city of Chicago, county of Cook, and State of Illinois, have invented a new and useful Improvement in Roller-Bearings, of which the following is a specification.

My invention relates to roller-bearings in which a series of rollers are held within a cage composed of rings or collars forming the ends of the cage, the said collars or rings being secured together by longitudinal stay-bolts, the said rollers revolving about the balls held in the end of the said rollers and collars, and the said balls acting as bearings for said rollers.

The object of my invention is to provide a cage for a roller-bearing in which a series of rollers are pivoted to collars or rings surrounding the axle, which said collars or rings may be removed from or replaced about the axle or shaft without removing the shaft, and the said roller-bearing having means provided for taking up the end-thrust or inequalities in the bearings of the said rollers. I attain this object by means of the mechanism shown in the accompanying drawings, in which—

Figure 1:
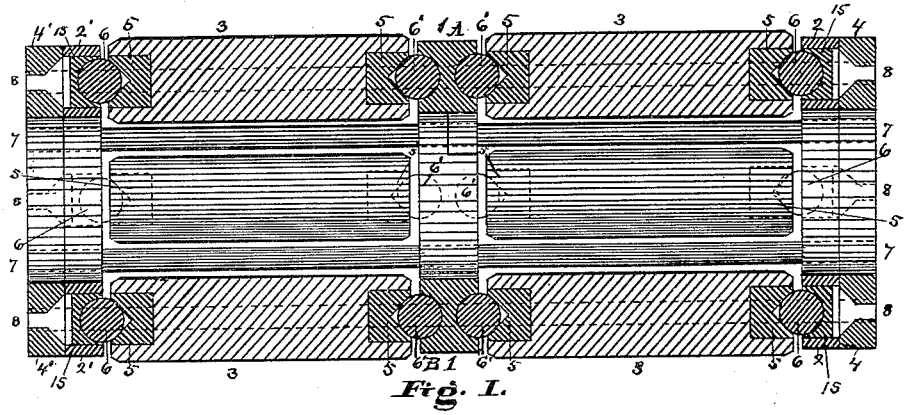
Figure 2:
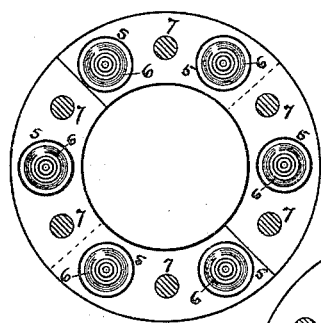
Figure 3:
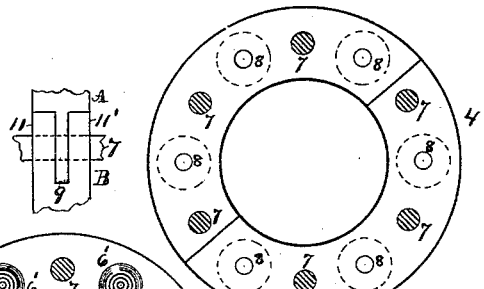
Figure 4:
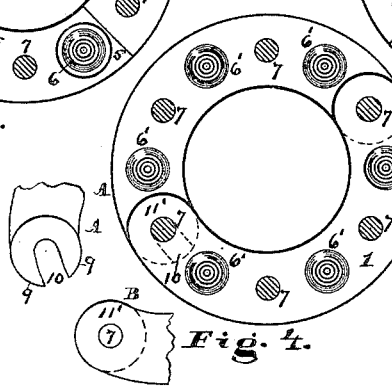

Figure 1 is a vertical longitudinal section of the cage and collars and rollers in the median line. Fig. 2 is an end view of collar 2, showing the balls situated in the sockets of the said collar. Fig. 3 is an outer view of the collar 4, showing the position of the holes 8. Fig. 4 is an end view of the collar 1, showing the manner of connecting the different segments of the collar in detail.

Similar letters and numerals refer to similar parts throughout the several views.

I make supporting-rings 4 and 4' with a hole in the center for the accommodation of a shaft or axle. At convenient points I drill holes 8 through these rings 4 and 4'. On the inner surface of the said rings I ream out the holes 8 to form a conical depression, and I make the same number of such holes 8 as there may be rollers 3 in each section of the said roller-bearing. In juxtaposition with the said rings 4 and 4' I make rings 2 and 2' of a similar diameter with the rings 4 and 4', and in the rings 2 and 2' I drill holes of a diameter equal to the diameter of the sockets terminating in the holes 8, drilled in the rings 4 and 4', and into the holes so drilled in the rings 2 and 2' I fit the metallic plugs 15, having in their outer ends as related to the said rings 2 and 2' pits for the reception of the metallic balls 6, which act as bearings upon which the rollers 3 revolve. The said rings 4 and 4' and 2 and 2' are drilled at convenient points for the reception of the stay-bolts 7, which transfix them, and are employed to hold the entire cage together. The cage, it should be understood, consists of the said rings 4 and 4' and 2 and 2' and 1 with the stay-bolts 7.

At a convenient distance from the rings 2 and 2' I make a central ring 1, which is composed of two segments A and B. The said segments A and B are united on one side by one of the longitudinal stay-bolts 7 passing through holes drilled in the interlocking portions of the segments A and B, marked, respectively, 12 and 13. The edges of the said segments A and B are rounded to allow of the swing of the segments A and B about the said stay-bolt 7. The other sides of the segments A and B are likewise rounded on their edges, the segment A being provided with a forked tongue 9, having an opening 10 in the said tongue which passes over the stay-bolt 7 and between the arms 11 and 11' of the segment B. This said ring 1 at convenient points on each opposite surface of the same has pits for the reception of the balls 6', in which they are held, and at suitable points the ring 1 is drilled to accommodate the stay-bolts 7.

Between the rings 2 and 2' and 1 I place a series of cylindrical rollers, each of which rollers 3 has in its ends a hole drilled for the reception of a metallic plug 5. These said metallic plugs 5 are drilled with a conical pit in the center of each, in which revolve the balls 6 and 6', as the case may be.

Having thus described the parts of my invention, I now proceed to explain the method of using the same.

I place the balls 6' and 6 in their proper positions in the rings 2 and 2', having in the case of the rings 2 and 2' placed the plugs 15 in the holes drilled for the same, and between the said rings 2 and 2' and 1 I place the rollers 3, so that the said rollers 3 shall revolve on the balls 6 and 6' as bearings. I then place rings 4 and 4' in contact with the rings 2 and 2', so adjusted that the holes 8 in the said rings 4 and 4' shall be opposite the center of the plugs 15. I then secure the said rings 2 and 2', 1, and 4 and 4' together by means of the stay-bolts 7, each ring being cut at right angles with its fellow. I then pour into the holes 8 and the cavity left in the rings 2 and 4 and 2' and 4' Babbitt metal or other suitable compound to fill up the said cavity and hold the balls 6 and rollers 3 securely in their bearings.

I am aware that roller-bearings in the abstract are not a new discovery, and I do not therefore claim roller-bearings in the broad sense; but What I do claim, and desire to secure by Letters Patent, is—

1. A roller-bearing provided with sectional supporting-rings and with rollers the ends of which have recessed plugs to receive the bearing-balls.

2. A roller-bearing the rollers of which have recessed ends provided with plugs also recessed to receive bearing-balls, sectional supporting-rings having recessed plugs corresponding to the rollers, and additional end rings having a filling of Babbitt metal back of and supporting each plug in the adjacent end ring.

3. A roller-bearing comprising sectional, central, and end rings, rods connecting said rings, rollers provided with recessed plugs in their ends, and balls interposed between said rings and the recesses in the ends of the rollers.

ERNEST WM. COOKE.

In presence of—
E. O. FAULKNER,
H. HAUPT, Jr.